US008108874B2

(12) United States Patent
Ogasawara et al.

(10) Patent No.: US 8,108,874 B2
(45) Date of Patent: Jan. 31, 2012

(54) MINIMIZING VARIATIONS OF WAITING TIMES OF REQUESTS FOR SERVICES HANDLED BY A PROCESSOR

(75) Inventors: Takeshi Ogasawara, Tokyo-to (JP); Hideaki Komatsu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 11/753,479

(22) Filed: May 24, 2007

(65) Prior Publication Data

US 2008/0295108 A1 Nov. 27, 2008

(51) Int. Cl.
G06F 9/46 (2006.01)
G06F 15/173 (2006.01)
(52) U.S. Cl. ......... 718/104; 709/224; 709/225; 709/226
(58) Field of Classification Search .................... 718/104
See application file for complete search history.

(56) References Cited

U.S. PATENT DOCUMENTS

| 2006/0173982 | A1* | 8/2006 | Bournas | 709/223 |
| 2008/0021988 | A1* | 1/2008 | Abernethy et al. | 709/223 |

FOREIGN PATENT DOCUMENTS

JP 2004213624 A 7/2004

* cited by examiner

Primary Examiner — Kenneth Tang
(74) Attorney, Agent, or Firm — Vazken Alexanian

(57) ABSTRACT

Variations of waiting times of requests for services handled by a processor are minimized. In response to the processor receiving a request for a service, an arrival time of the request for the service is recorded and added to a total arrival time for all requests for the service, and a counter of a number of waiting requests for the service is incremented. In response to the processor processing the request, the arrival time of the request is subtracted from the total arrival time, and the counter is decremented. In either case, an average waiting time of requests for the service is determined, a history of the average waiting times is maintained, and the variation within this history is determined. Where the variation is greater than a threshold, processor resources are adjusted to minimize variations within waiting times of requests for all the services handled by the processor.

14 Claims, 3 Drawing Sheets

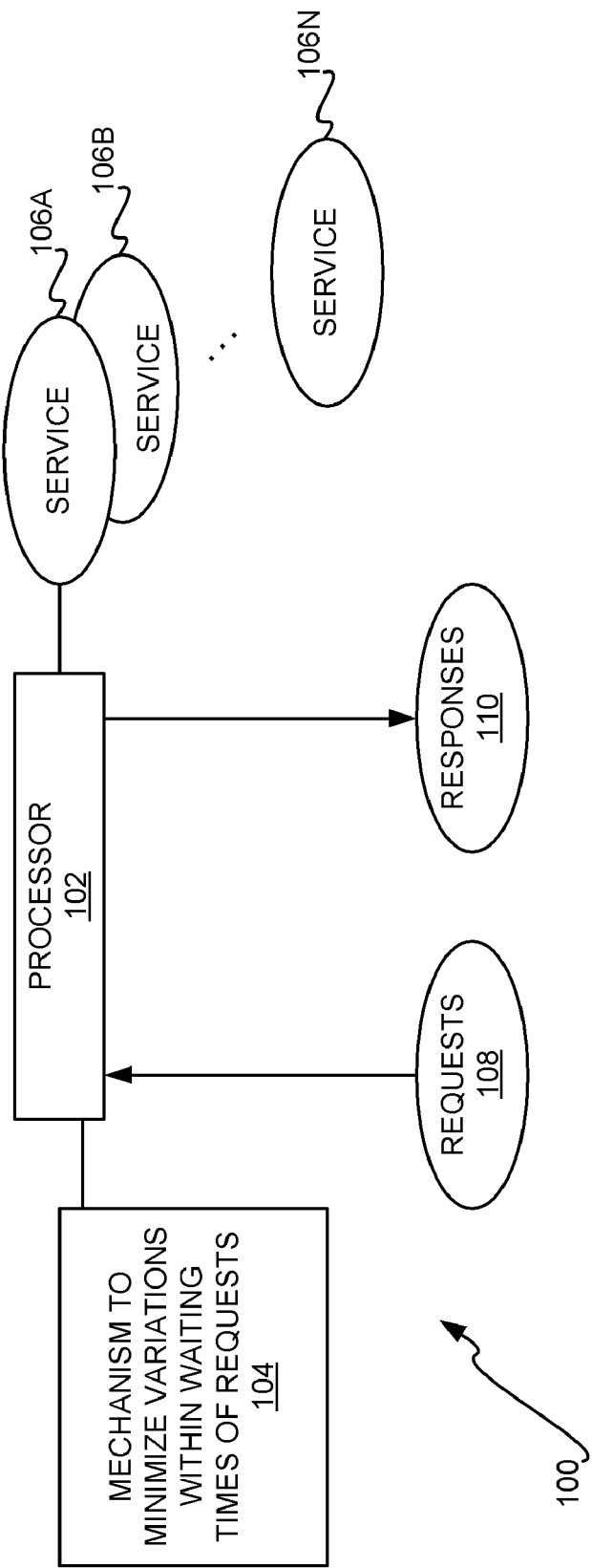

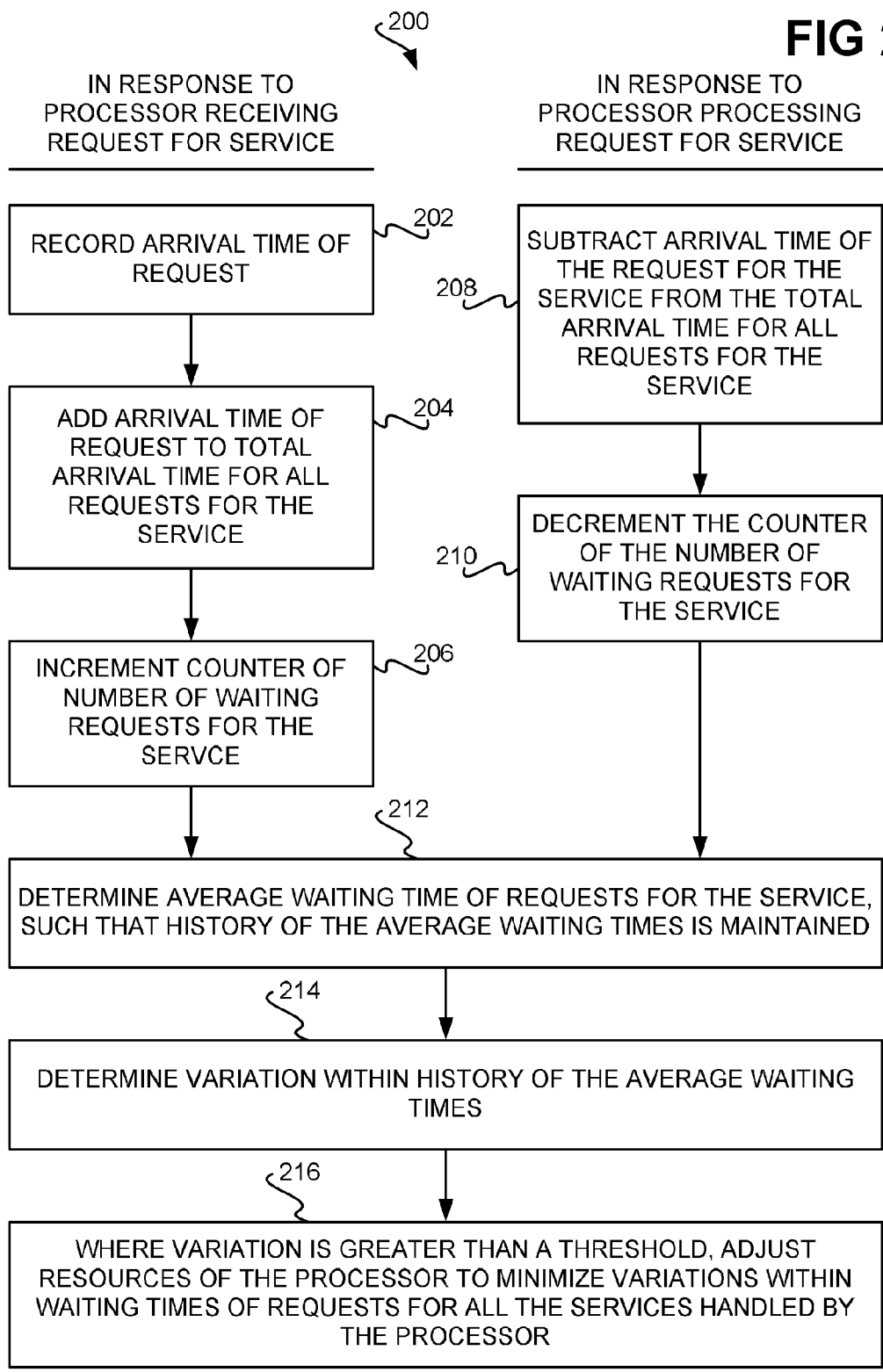

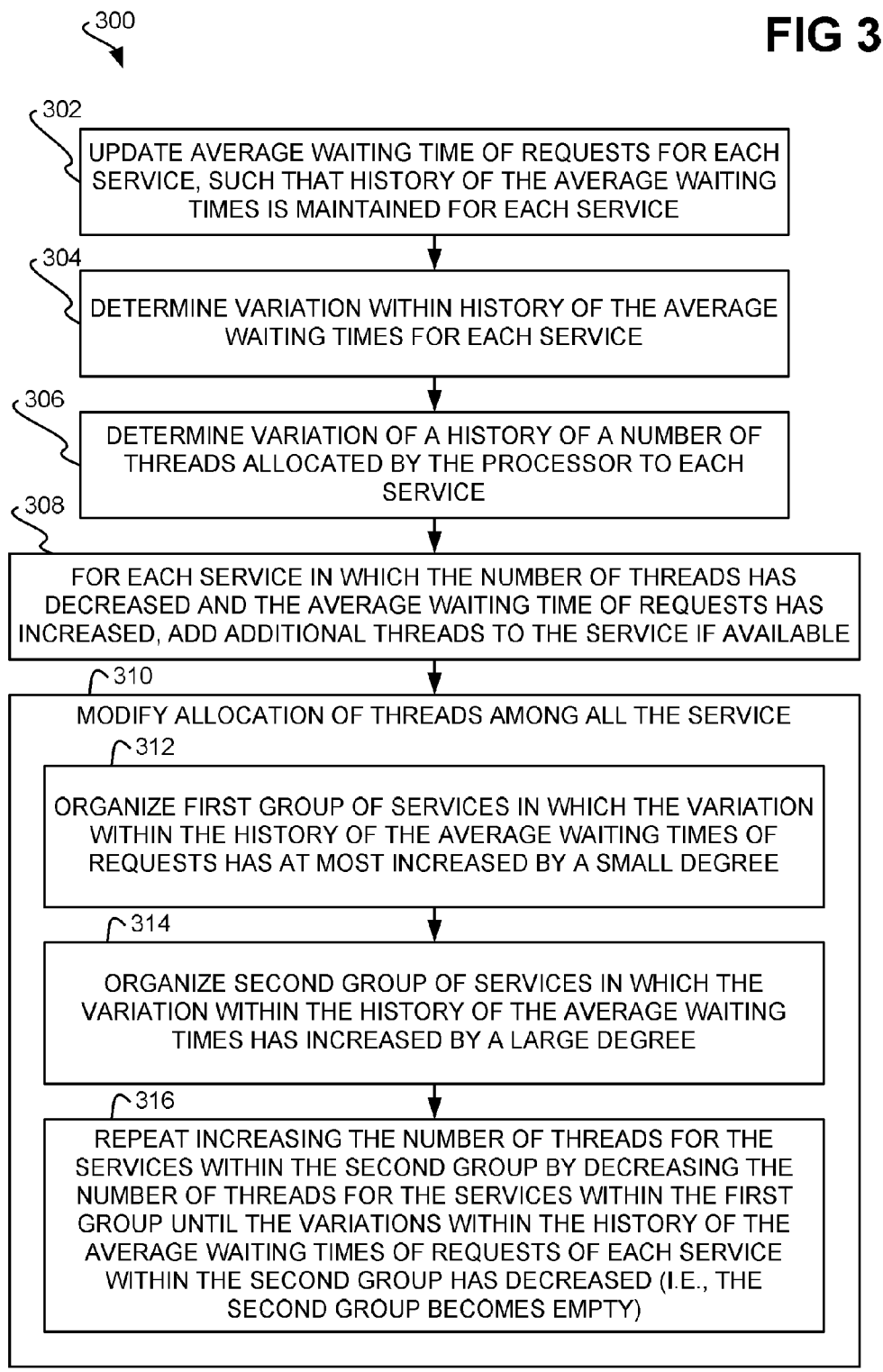

MINIMIZING VARIATIONS OF WAITING TIMES OF REQUESTS FOR SERVICES HANDLED BY A PROCESSOR

FIELD OF THE INVENTION

The present invention relates generally to the handling of services by a processor, where the processor responds to requests for these services. The invention relates more particularly to minimizing variations within the waiting times of such requests for the services.

BACKGROUND OF THE INVENTION

Many types of computerized systems and computing devices, especially servers, are designed to handle requests for services, process these requests, and provide responses to the requests. The request may originate from other types of computing devices, especially clients, or from within the computing device handling the request itself. A service may be considered functionality provided by given software, where the service is interacted with by providing requests for the service to perform functionality, and in response by receiving responses to the requests in which the results of this functionality is provided.

For efficient utilization of computing resources, among other reasons, a processor that handles the requests for services desirably runs at full utilization, or 100%, instead of idling at some periods such that its utilization is less than 100%. However, running a processor at full utilization while providing timely responses to requests for services can be difficult. In particular, requests for services should be responded to within a given amount of time. Where this given amount of time is specified, therefore, it is desirable to minimize variations within the waiting times for responding to requests for services. If variations are not minimized, then performance can suffer, especially when the waiting times unduly increase.

For these and other reasons, therefore, there is a need for the present invention.

SUMMARY OF THE INVENTION

The present invention relates to minimizing variations of waiting times of requests for services handled by a processor. In a method of one embodiment, in response to the processor receiving a request for a service, the arrival time of the request is recorded, is added to the total arrival time for all requests for the service in question, and a counter of the number of waiting requests for the service is incremented. In response to the processor processing the request for the service, the arrival time of the request is subtracted from the total arrival time for all the requests for the service, and the counter of the number of waiting requests for this service is decremented.

In either case, the average waiting time of requests for the service is determined, such that a history of the average waiting times of requests for the service is maintained. The variation within the history of the average waiting times of requests for the service is determined. Where the variation is greater than a threshold, resources of the processors—such as allocation of threads to the services—are adjusted to minimize variations within the waiting times of requests for all the services handled by the processor. In this way, when a processor is especially running at 100% utilization, services are provided by the processor in a consistent, efficient manner. It is noted that in one embodiment, the method can be implemented as one or more programs stored on a computer-readable medium, such as a tangible computer-readable medium like a recordable data storage medium.

A computerized system of an embodiment of the invention, such as a computing device, includes a processor and a mechanism. The mechanism is to minimize variations of waiting times of requests for services handled by the processors. The mechanism records arrival times of the requests for all the services, and maintains total arrival times of the requests for the services based on the arrival times of the requests as have been recorded. The mechanism further maintains counters of the numbers of waiting requests for the services based on receipt of the requests and processing of the requests. The mechanism also maintains histories of average waiting times of requests for the services, based on the total arrival times of the requests for the services. The mechanism adjusts resources of the processor, based on variations within the histories of the average waiting times of requests for the services, to minimize the variations of the waiting times of requests handled by the processors.

Still other aspects, embodiments, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of a system, according to an embodiment of the invention.

FIG. 2 is a flowchart of a method for minimizing variations within the waiting times of requests for services handled by a processor, according to an embodiment of the invention.

FIG. 3 is a flowchart of a method for allocating processor resources to minimize variations within the waiting times of requests for services handled by a processor, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows a computerized system 100, according to an embodiment of the invention. The system 100 includes a processor 102 and a mechanism 104. The system 100 may be implemented as a single computing device in one embodiment, such as a server computing device. The system 100 typically includes other components, in addition to those depicted in FIG. 1, as can be appreciated by those of ordinary skill within the art.

The processor 102 implements a number of services 106A, 106B, . . . , 106N, collectively referred to as the services 106. A service may be considered functionality provided by software, as can be appreciated by those of ordinary skill within the art. The services 106 operate by the processor 102 receiving requests 108 for a service, processing the requests 108, and in response potentially returning responses 110 that may indicate the results of the processing performed. The requests 108 may originate within the system 100 (i.e., within the computing device that includes the processor 102), or may originate external to the system 100 (e.g., from client devices communicatively connected to the computing device that includes the processor 102).

The mechanism 104 minimizes variations within the waiting times of the requests 108. The waiting time of a request may be the length of time after a request for a service is received by the processor 102 before the request is actually processed by the processor 102. The manner by which such variations are minimized by the mechanism 104 is described in more detail later in the detailed description. The mechanism 104 may be implemented in software, hardware, or a combination of software. The mechanism 104 may be a part of the processor 102, or may be external to the processor 102. Desirably, the processor 102 is maintained at 100% utilization at least at substantially all times, such that the variations in question are minimized during utilization of the processor at 100%.

FIG. 2 shows a method 200 for minimizing variations within the waiting times of requests for services handled by a processor of a computing device, according to an embodiment of the invention. The method 200 may be performed by the mechanism 104, for instance. As such, the method 200 may be performed to minimize variations within the waiting times of the request 108 for the services 106 handled by the processor 102 of the computerized system 100.

Parts 202, 204, 206, 212, 214, and 216 are performed in response to the processor receiving a request for a service. Parts 208, 210, 212, 214, and 216 are performed in response to the processor processing a request for a service. The processor receiving a request for a service means that the processor receives a request for a given service (or a part thereof) to be performed.

Thus, in response to the processor receiving a request for a service, the arrival time of the request is recorded (202). The arrival time may be denoted as $T_{arrive}(r)$, where r is the particular request that has been received. Next, the arrival time is added to the total arrival time for all requests for the service (204). This total arrival time for all the requests for the service in question may be denoted as $T_{total}(s)$, where s the particular service in question. A counter of the number of waiting requests for the service is also incremented (206). This counter may be denoted as N(s).

In response to the processor processing a request for a service, the arrival time for the request for the service that was previously recorded is subtracted from the total arrival time for all requests for this service to which the arrival time was previously added (208). Furthermore, the counter of the number of waiting requests for the service is decremented (210).

From either part 206 or from part 210, the method next determines the average waiting time of requests for the service in question (212), and maintains a history of these average waiting times determined. The average waiting time of a request for a service is the length of time each outstanding request that has not yet been processed by the processor has waited thus far (i.e., until part 212 is performed). The average waiting time can be denoted as WT(s), and expressed as $$\frac{1}{N(s)} \sum_{r=1}^{N(s)} T_{current} - T_{arrive}(r),$$

where $T_{current}$ is the current time.

The variation within the history of the average waiting times—i.e., all the WT(s) that have been recorded for the service s—is determined (214). In one embodiment, the variation may be simply determined by comparing the most recent (i.e., last) WT(s) to the first WT(s) that was recorded. That is, the variation may be determined as $$\frac{WT(s)_{last} - WT(s)_{first}}{WT(s)_{first}},$$

where $WT(s)_{last}$ is the average waiting time most recently determined, and $WT(S)_{first}$ is an average waiting time of a request for the service that determined first. In another embodiment, the variation may be determined in a more sophisticated manner, such as a moving average of such variations within the history of the average waiting times of requests for the service in question, as can be appreciated by those of ordinary skill within the art.

If the variation is greater than a threshold, the resources of the processor are adjusted to minimize variations within the waiting times of requests for all the services handled by the processor (216). In one embodiment, the threshold may be specified in milliseconds. For example, the processor may have a number of threads that are allocated among the services, where a thread can be a considered a pipeline into which instructions of a service are input for processing, and where the processor may be able to handle up to a maximum number of such threads. In such instance, the processor may add threads to services having too great of variations, and/or may reallocate the threads among the services, so that variations within the waiting times of requests for all the services are minimized. One specific approach to adjusting such processor resources to minimize variations within the waiting times of requests for all the services handled by the processor is discussed next.

FIG. 3 therefore shows a method 300 for adjusting processor resources so that variations within the waiting times of requests for all the services handled by the processor are minimized, according to an embodiment of the invention. The method 300 can implement part 216 of the method 200 in one embodiment. First, the average waiting time of requests for each service is updated (302), such that the history of the average waiting times is maintained for each service. That is, part 212 of the method 200 is performed for each service to implement part 302. Next, the variation within the history of the average waiting times is determined for each service (304). That is, part 214 of the method 200 is performed for each service to implement part 304.

Furthermore, the variation of a history of a number of threads allocated by the processor to each service is determined (306). As the processor allocates and deallocates threads to a given service, the number of threads that execute the service is tracked, so that a history of this number of threads is maintained. The variation in part 306 can be determined in the same manner as to which the variation of the history of the average waiting times is determined in part 214 of the method 200, or it can be determined in another manner, as can be appreciated by those of ordinary skill within the art.

Now, for each service in which the number of threads has decreased, and the average waiting time has increased, additional threads are added (i.e., allocated) to the service (308), if such additional threads are available. The number of threads decreasing for a service means that the variation determined in part 306 for this service is negative, whereas the average waiting time increasing for the service means that the variation determined in part 304 for this service is positive. The processor at some points in time may not have allocated all available threads among all the services. In such instance, if there are one or more unused threads, then they are allocated to the services in which the numbers of threads have decreased and the average waiting times have increased, desirably in a distributed manner.

Thereafter, once all the threads have been allocated to all the services, the allocation of threads among the services is modified (310). In particular, a first group of services is organized, in which the variation within the history of the average waiting times of requests has decreased or has at most increased by a small degree (i.e., by no more than a threshold) (312). In addition, a second group of services is organized, in which the variation within the history of the average waiting times of requests has increased by a large degree (i.e., by more than a threshold) (314). The small degree and the large degree may determined dynamically, or via previous testing. Both such thresholds may be specified in milliseconds.

Thereafter, the number of threads for each of the services in the second group is increased, and the number of threads for each of the services is decreased, in a repeated iterative manner until the variations within the history of the average waiting times of requests of each service within the second group has decreased below the large degree of part 314 (316). That is, threads are reallocated from services within the first group to services within the second group until the second group becomes empty. The manner by which threads are reallocated from services within the first group to services within the second group is not limited by embodiments of the invention.

For example, in one embodiment, a thread is deallocated from a service in the first group and allocated to a service in the second group, in a round-robin manner, such that threads are proportionally taken from services of the first group and reassigned to services of the second group until the second group becomes empty. That is, threads are allocated from the first group to the second group on a one-by-one basis. In other embodiments, however, thread reallocation from services within the first group to services within the second group may be performed in a more sophisticated manner.

For example, threads may be decreased from services within the first group based on the variations within their histories of average waiting times, such that more threads are taken from services having smaller variations than from threads having larger variations. Likewise, threads may be added to services within the second group based on the variations within their histories of average waiting times, such that more threads are added to services having larger variations than to threads having smaller variations. In this way, thread reallocation is performed more consistently.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computerized method for minimizing variations of waiting times of requests for services handled by a processor of a computing device, comprising:
    in response to the processor receiving the request for a service and in response to the processor processing the request for the service, where the variation within a history of average waiting times of requests for the service is greater than a threshold, adjusting resources of the processor to minimize variations within waiting times of requests for all the services handled by the processor, by:
        updating an average waiting time of requests for each service handled by the processor, such that a history of the average waiting times of requests for each service is maintained;
        determining a variation within the history of the average waiting times of requests for each service;
        determining a variation of a history of a number of threads allocated by the processor to each service, where the resources of the processor comprises a plurality of threads that are allocated among the services;
        for each service in which the number of threads has decreased and the average waiting time of requests has increased, adding additional threads to the service in proportion to a decrease of the number of the threads;
    in response to one or more of the services in which the number of threads has not increased and the average waiting time of requests has increased, modifying allocation of the threads among all the services, by:
        organizing one or more of the services within a first group of services in which the variation within the history of the average waiting times of requests has at most increased by a degree less than a first degree threshold;
        organizing one or more other of the services within a second group of services in which the variation within the history of the average waiting times of requests has increased by a degree greater than a second degree threshold; and,
        repeatingly increasing the numbers of threads for the services within the second group by decreasing the numbers of threads for the services within the first group, until the variation within the history of the average waiting times of requests of each service within the second group has decreased so that no more services are present within the second group.

2. The method of claim 1, further comprising, in response to the processor receiving the request for the service and in response to the processor processing the request for the service, determining the average waiting time of requests for the service by determining the average waiting time as $$\frac{1}{N}\sum_{r=1}^{N} T_{current} - T_{arrive}(r),$$

where N is the counter of the number of waiting requests for the service, $T_{current}$ is a current time, and $T_{arrive}(r)$ is the arrival time of request r for the service.

3. The method of claim 1, further comprising, in response to the processor receiving the request for the service and in response to the processor processing the request for the service, determining the variation within the history of the average waiting times of requests for the service comprises determining the variation as $$\frac{WT_{last} - WT_{first}}{WT_{first}},$$

where $WT_{last}$ is the average waiting time most recently determined, and $WT_{first}$ is an average waiting time that was received determined first.

4. The method of claim 1, further comprising, in response to the processor receiving the request for the service and in response to the processor processing the request for the service, determining the variation within the history of the average waiting times of requests for the service comprises determining the variation as a moving average of variations within the history of the average waiting times of requests for the service.

5. The method of claim 1, wherein increasing the numbers of threads for the services within the second group by decreasing the numbers of threads for the services within the first group comprises increasing the number of threads for each service within the second group by one by decreasing the numbers of threads for the services within the first group in a distributed manner.

6. The method of claim 1, wherein increasing the numbers of threads for the services within the second group by decreasing the numbers of threads for the services within the first group comprises increasing the number of threads for each service within the second group based on the variation within the history of the average waiting times of requests by decreasing the numbers of threads for each service within the first group based on the variation within the history of the average waiting times of requests.

7. The method of claim 1, wherein utilization of the processor is maintained at 100%.

8. A computerized system comprising:
a processor;
a mechanism to minimize variations of waiting times of requests for services handled by the processor by adjusting resources of the processor, based on variations within histories of average waiting times of requests for the services to minimize the variations of the waiting times of requests for the services handled by the processor, including:
updating an average waiting time of requests for each service handled by the processor, such that a history of the average waiting times of requests for each service is maintained;
determining a variation within the history of the average waiting times of requests for each service;
determining a variation of a history of a number of threads allocated by the processor to each service, where the resources of the processor comprises a plurality of threads that are allocated among the services;
for each service in which the number of threads has decreased and the average waiting time of requests has increased, adding additional threads to the service in proportion to a decrease of the number of the threads;
in response to one or more of the services in which the number of threads has not increased and the average waiting time of requests has increased, modifying allocation of the threads among all the services, by:
organizing one or more of the services within a first group of services in which the variation within the history of the average waiting times of requests has at most increased by a degree less than a first degree threshold;
organizing one or more other of the services within a second group of services in which the variation within the history of the average waiting times of requests has increased by a degree greater than a second degree threshold; and,
repeatingly increasing the numbers of threads for the services within the second group by decreasing the numbers of threads for the services within the first group, until the variation within the history of the average waiting times of requests of each service within the second group has decreased so that no more services are present within the second group.

9. The computerized system of claim 8, wherein the mechanism is implemented within the processor.

10. The computerized system of claim 8, wherein the mechanism is implemented external to the processor.

11. The computerized system of claim 8, wherein the mechanism is implemented at least in software.

12. The computerized system of claim 8, wherein the mechanism is implemented at least in hardware.

13. The computerized system of claim 8, wherein the computerized system is a computing device.

14. A non-transitory computer readable medium having one or more computer programs stored thereon to perform a method for minimizing variations of waiting times of requests for services handled by a processor of a computing device, the method comprising:
in response to the processor receiving a request for a service,
recording an arrival time of the request for the service;
adding the arrival time of the request for the service to a total arrival time for all requests for the service;
incrementing a counter of a number of waiting requests for the service;
in response to the processor processing the request for the service;
subtracting the arrival time of the request for the service from the total arrival time for all the requests for the service;
decrementing the counter of the number of waiting requests for the service;
in response to the processor receiving the request for the service and in response to the processor processing the request for the service,
determining an average waiting time of requests for the service, such that a history of the average waiting times of requests for the service is maintained;
determining a variation within the history of the average waiting times of requests for the service; and,
where the variation within the history of the average waiting times of requests for the service is greater than a threshold,
adjusting resources of the processor to minimize variations within waiting times of requests for all the services handled by the processor, by:
updating an average waiting time of requests for each service handled by the processor, such that a history of the average waiting times of requests for each service is maintained;
determining a variation within the history of the average waiting times of requests for each service;

determining a variation of a history of a number of threads allocated by the processor to each service, where the resources of the processor comprises a plurality of threads that are allocated among the services;

for each service in which the number of threads has decreased and the proportion to a decrease of the number of the threads;

in response to one or more of the services in which the number of threads has not increased and the average waiting time of requests has increased:

organizing one or more of the services within a first group of services in which the variation within the history of the average waiting times of requests has at most increased by a degree less than a first degree threshold;

organizing one or more other of the services within a second group of services in which the variation within the history of the average waiting times of requests has increased by a degree greater than a second degree threshold; and, repeatingly increasing the numbers of threads for the services within the second group by decreasing the numbers of threads for the services within the first group, until the variation within the history of the average waiting times of requests of each service within the second group has decreased so that no more services are present within the second group.

* * * * *